Figure 3:
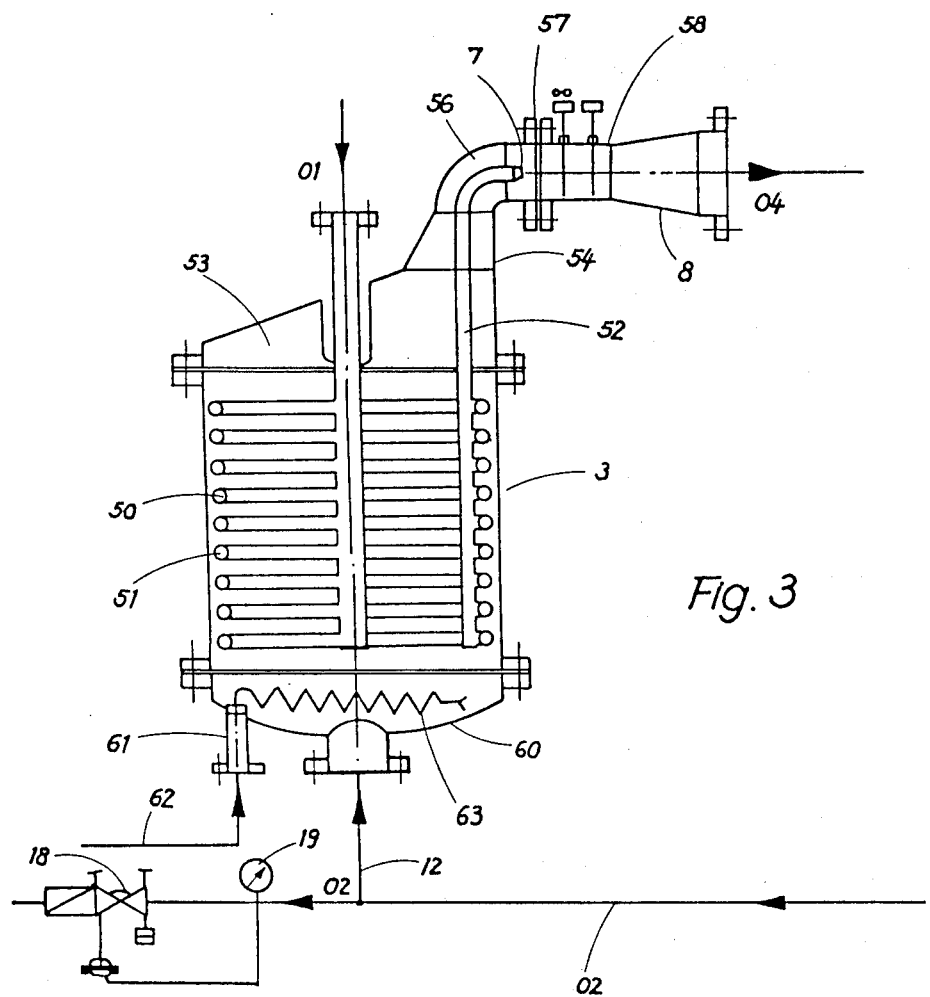

United States Patent [19]

Bälz

[11] Patent Number: 4,477,021
[45] Date of Patent: Oct. 16, 1984

[54] METHOD AND APPARATUS FOR A REGULATED HEAT TRANSFER FROM A PRIMARY STEAM NETWORK TO A HEAT CONSUMER

[76] Inventor: Helmut Bälz, Kopfstrasse 5, D-7100 Heilbronn, Fed. Rep. of Germany

[21] Appl. No.: 346,036
[22] PCT Filed: Jun. 19, 1981
[86] PCT No.: PCT/DE81/00093
§ 371 Date: Jan. 28, 1982
§ 102(e) Date: Jan. 28, 1982
[87] PCT Pub. No.: WO81/03680
PCT Pub. Date: Dec. 24, 1981

[30] Foreign Application Priority Data

Jun. 19, 1980 [DE] Fed. Rep. of Germany ....... 3022795

[51] Int. Cl.³ ............................................... F25C 1/18
[52] U.S. Cl. ...................................... 237/67; 237/59; 237/6
[58] Field of Search ................... 237/59, 64, 63, 56, 237/67, 6

[56] References Cited

FOREIGN PATENT DOCUMENTS

| | | | |
|---|---|---|---|
| 354341 | 10/1928 | Belgium | 237/59 |
| 431189 | 12/1938 | Belgium | 237/59 |
| 2225263 | 12/1973 | Fed. Rep. of Germany | 237/59 |
| 137471 | 6/1978 | Fed. Rep. of Germany | 237/59 |
| 73896 | 5/1917 | Switzerland | 237/67 |
| 222899 | 10/1924 | United Kingdom | 237/59 |

Primary Examiner—Albert J. Makay
Assistant Examiner—Henry Bennett
Attorney, Agent, or Firm—Frishauf, Holtz, Goodman & Woodward

[57] ABSTRACT

In a method for the regulated transfer of heat from a primary steam network (010), the flow (04) of the heat consumer (2) is supplied at a predetermined excess pressure, while the return flow (02) is at a relatively lower pressure.

In order to be able to utilize the existing steam pressure of the steam network (010) in transferring heat from the primary steam network (10) to the heat consumer (2), and to be thus able to obtain the operating energy for the flow (04) of the heat consumer, the method according to the invention provides that the steam drawn from the steam network (010) in accordance with the heat consumption by the consumer (2) is cooled down, by withdrawing heat from a secondary medium while maintaining a predetermined excess pressure relative to the flow pressure of the heat consumer (2), to the point of condensation; the excess pressure in an injector pump (8) is then reduced to the flow pressure of the heat consumer (2) is then reduced to the flow pressure of the heat consumer (2) while generating a corresponding operating energy for the flow (04), and the secondary medium heated by the cooling down of the steam is admixed with the flow (04) to the consumer.

11 Claims, 3 Drawing Figures

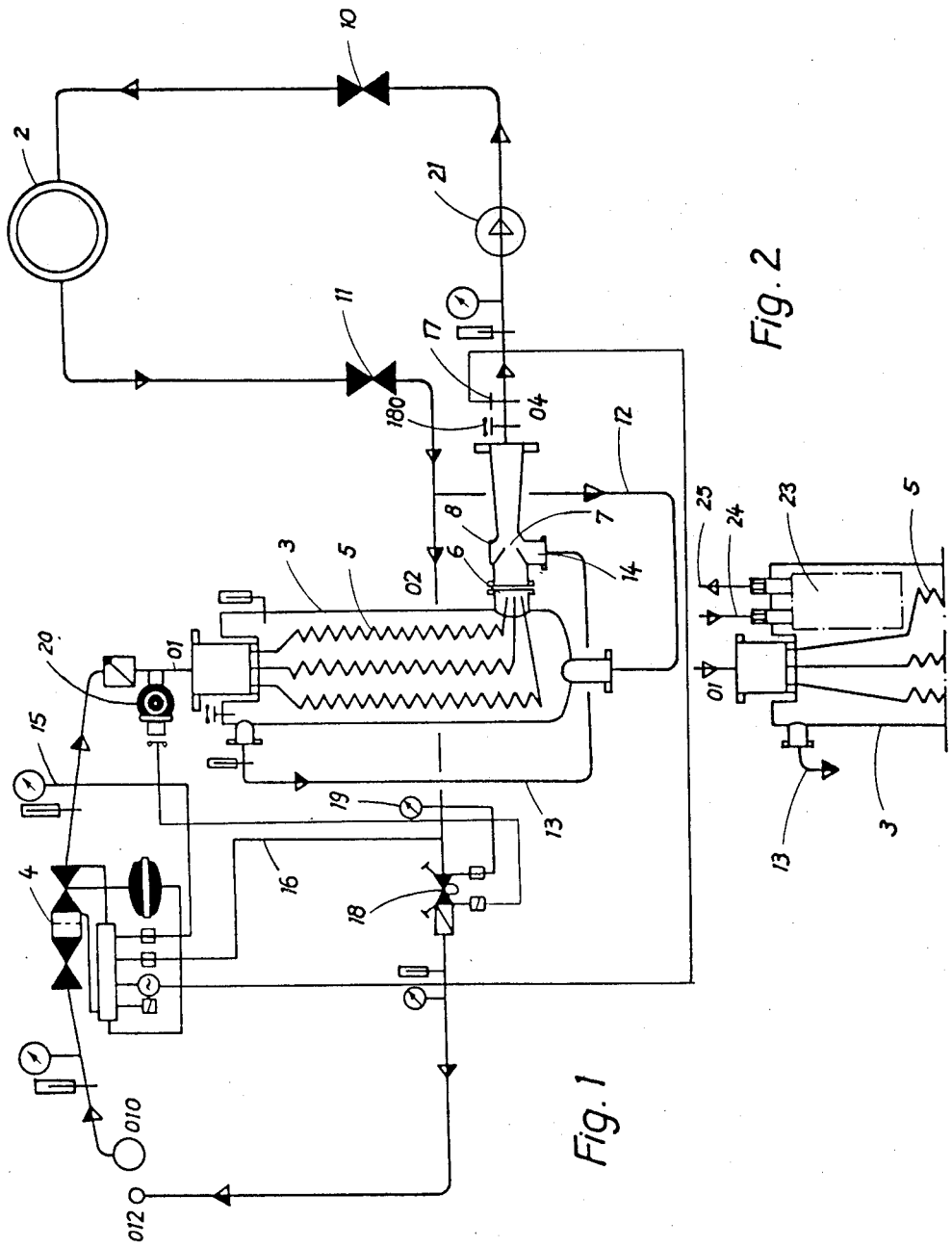

METHOD AND APPARATUS FOR A REGULATED HEAT TRANSFER FROM A PRIMARY STEAM NETWORK TO A HEAT CONSUMER

The invention relates to a method for the regulated transfer of heat from a primary steam network to a heat consumer in which steam flow is supplied at a predetermined excess pressure and return flow is at a relatively low pressure. The invention furthermore relates to an apparatus for performing this method, having a heat exchanger which is regulated on the steam side in accordance with the consumption of heat by the heat consumer.

BACKGROUND

In supplying heat to a heat consumer from a steam network, it is known to provide a heat exchanger between the steam network and the heat consumer, the heat exchanger being regulated on either the steam or the condensate side and the heat consumer being located in the secondary circuit of the heat exchanger. A pump is required in the secondary circuit in order to generate the required operating pressure.

The pressure difference prevailing on the primary side, between the steam supply line and the condensate return line, is utilized solely to assure a flow through the heat exchanger on the primary side; it necessitates a corresponding expenditure for pipes and fittings, in which energy losses occur.

THE INVENTION

It is the object to point the way to utilizing the existing steam pressure of the steam network, when effecting heat transfer from a primary network to a heat consumer, in such a manner that the operating energy for the flow of the heat consumer can be derived from the primary steam network.

Briefly, according to the invention the steam drawn from the steam network in accordance with the heat consumption by the heat consumer is cooled to the point of condensation by the removal of heat in a heat exchanger using a secondary medium. A predetermined excess pressure relative to the circulating pressure of a secondary heat carrying medium supplying the consumer is maintained. The excess pressure is used in an injector pump and there reduced to the circulating pressure of the medium for the heat consumer, generating a corresponding operating energy for the flow system therein. The secondary medium, which has been heated in the heat exchanger as the steam cools, is admixed to the flow.

The cold secondary medium may efficaciously be diverted from the cooled return flow from the heat consumer.

In this method, the vapor pressure of the steam network can be utilized directly for generating operating energy for the flow of steam to the heat consumer, so that a separate circulation pump for the heat consumer can either be eliminated or, should such a pump be required anyway because of the network resistance, it may be designed for a substantially smaller output.

The apparatus includes, in accordance with the invention, the heat exchanger, which is connected to the steam network via a regulating valve and which cools the supplied steam down to the condensation point. It is connected to the condensate side with the operating nozzle of an injector pump located in the flow line of the heat consumer. The operating nozzle of this pump is exposed to the condensate, which is at a predetermined excess pressure, and on its intake side the pump is disposed in a secondary circuit of the heat exchanger in which secondary medium flows which has been heated by the steam, this secondary medium can be mixed by the injection pump in predetermined proportions with the steam flow in the heat consumer network.

The apparatus is efficaciously disposed such that the secondary circuit of the heat exchanger branches off from the return flow line of the heat consumer, the return flow line being connected directly to the condensate line of the steam network via appropriate regulating devices.

The injector pump is advantageously of the type which can be regulated, so as to enable adaptation to heat exchanger conditions.

Should the operating energy generated by the injector pump be insufficient, then an additional pressure-elevating pump can be located in the flow line of the heat consumer, behind the injector pump in terms of the direction of flow. However, this pressure-elevating pump needs to be designed for merely a partial pressure; or it may be only intermittently operable, for example being shut off from time to time via a differential-pressure switch, thus saving electrical energy.

A pressure maintenance valve which prevents the system from running empty is advantageously located in the return line of the heat consumer, behind the point, in terms of the flow direction, where the secondary circuit of the heat exchanger branches off.

The steam pressure provides for the maintenance of the minimum pressure in the system as a whole, and changes in volume caused by fluctuations in temperature are compensated for by the vapor pressure in combination with the pressure maintenance valve. Thus a volume-equalization container or the pressure maintaining devices which are otherwise required or are very expensive become unnecessary. At the same time, evaporation in the water circuit is prevented.

The heat exchanger may additionally include a water heater for industrial use. The apparatus may also be designed such that the heat exchanger is additionally connected, in the vicinity of the secondary-medium inlet, to a drainage line of the steam network. Thus the heat contained in the condensate that would otherwise flow out through the drainage line can also be utilized.

The heat exchanger structure may advantageously be such that it includes at least one nest of pipes supplied with steam and connected at the outlet side to the operating nozzle, while the mixing nozzle of the injector pump is connected directly to an appropriate fitting on the heat exchanger head.

Exemplary embodiments of the subject of the invention are shown in the drawing. The schematic illustrations are:

FIG. 1, an apparatus according to the invention for the regulated transfer of heat from a primary steam network to a heat consumer;

FIG. 2, the heat exchanger of the apparatus of FIG. 1, seen in detail and in a modified form of embodiment; and FIG. 3, the heat exchanger of the apparatus of FIG. 1 in a different form of embodiment, in an axial section and in a lateral view.

In FIG. 1, a steam heating system is shown which serves to transfer heat from a primary steam network 010 to a heat consumer 2. The heat consumer may be embodied as a heating, ventilation, air conditioning, or industrial water heating system for heating bodies or radiators, heater apparatus and the like, depending on the embodiment of the system.

The system has a heat exchanger 3, which is connected via a multi-purpose regulating valve 4 and a steam supply line 01 to the steam network 010. The heat exchanger 3 includes a nest of pipes 5 supplied with steam, and the nest of pipes 5 is connected at 6 with the operating nozzle 7 of an injector pump 8, which is flanged directly onto the heat exchanger 3. The injector pump is located in the flow line 04 of the heat consumer 2, whose return line 02 is connected to the condensate return flow line 012. A shutoff valve 10 and another shutoff valve 11 are disposed, respectively, in the flow line 04 associated with the heat consumer 2 and in the return flow line 02. A line 12 branches off from the return flow line 02 by way of which the cooled-down condensate is returned in a secondary circuit to the heat exchanger 3 and is there heated again in a countercurrent to the steam. This secondary medium, thus heated, is then aspirated via a line 13, which is connected to the intake fitting 14 of the injector pump 8, and mixed in a predetermined quantity with the flow of the heat consumer 2.

The multi-purpose regulating valve 4, via a pressure sensor 15, monitors the steam pressure ahead of the heat exchanger 3 and, via a pulse line 16, monitors the condensate pressure in the return flow line 02. The flow temperature of the heat consumer 2 is also monitored via a temperature sensor 17 located in the flow line 04. A safety thermostat 180 precedes the temperature sensor 17, and when this thermostat 180 responds, the supply of steam to the heat exchanger 3 is shut off.

A pressure maintenance valve 18 is located in the return flow line 02, disposed behind the branching-off point of the line 12 as seen in the direction of flow; via a pressure sensor 19, this valve 18 keeps the pressure in the return flow line 02 at a predetermined value. At the same time, it prevents the system from running empty should the pressure in the condensate network 012 collapse. A level limiter 20 located in the steam supply line 01 monitors the level of condensate buildup in the heat exchanger 3, and if a set threshold level is exceeded, the level limiter sends a brief opening pulse to the valve 18, even if no heat output is being drawn off at that time. Thus the drainage of the steam line 01 is always assured.

Steam flows via the steam supply line 01 into the nest of pipes 5 of the heat exchanger 3, and the multipurpose regulating valve 4 regulates the supply of steam in accordance with the temperature in the flow line 04 measured at 17. The nest of pipes 5 is dimensioned and structured such that the steam temperature drop takes place in this nest of pipes 5; thus by the end of the nest of pipes, the steam is already completely condensed, without an excessively great pressure drop having occurred. A predetermined excess pressure prevails at 6, that is, at the inlet of the operating nozzle 7, the excess being dimensioned such that is suffices for the operation of the injector pump 8, which generates from it the operating energy for the flow to the heat consumer 2.

The heat is drawn from the steam by means of the cooled heating medium flowing in a countercurrent through the nest of pipes 5 and diverted from the return flow line 02 via the line 12; this heating medium is thereby heated and finally, as already noted, mixed with the flow of the heat consumer 2 via the line 13 and the injector pump 8.

For the instance where the operating energy generated by the injector pump 8 is insufficient, an additional pressure-elevating pump may be provided in the flow line 04 as indicated by broken lines at 21. This pump needs merely to be designed for the remaining partial pressure still required. The pressure-elevating pump 21 may be shut off intermittently via a differential pressure switch, which responds to the pressure difference occurring at the heat consumer 2, thus saving electrical energy.

The minimum pressure in the system is continuously maintained by means of the steam pressure in cooperation with the pressure maintenance valve 18, thus preventing evaporation in the water circuit, that is, in the flow line 04 and in the return flow line 02, as well as in the lines 12, 13 and in the heat exchanger 3. The changes in volume of the heating medium caused by temperature fluctuations are compensated for with the steam pressure in cooperation with the pressure maintenance valve 18, so that separate volume-equalization containers or other expensive pressure maintenance devices become superfluous.

A hot-water heater 23 can additionally be built into the heat exchanger 2 [sic], as shown in FIG. 2; it is then located in its own hot-water circuit, not shown, to which it is connected via lines 24, 25.

FIG. 3 shows a modified structural embodiment of the heat exchanger 3. The nest of pipes 50 is made up of a number of pipes of circular annular shape, disposed coaxially relative to one another in the form of a basket or umbrella and connected to a condensate pipe 52 which discharges directly into the operating nozzle 7. The head 53 of the heat exchanger 3 associated with the steam inlet is embodied with a fitting 54 coaxial with the condensate pipe 52. This fitting 54 has a substantially frustoconical shape and is connected directly, via a pipe bend 56, with the mixing nozzle 58 of the injector pump 8, the mixing nozzle 58 being flanged onto the assembly at 57.

A fitting 61 for a drainage line, shown at 62, of the steam network 010 is inserted into the other head 60 of the heat exchanger 3, and a nest of pipes 63 accommodated in the head 60 is connected to the fitting 61. Condensate resulting from the drainage of the steam network is introduced via the line 62 into the secondary circuit of the heat exchanger 3, resulting in an additional recovery of heat. The nest of pipes 63 serves to prevent undesirable noises and vibrations as the condensate from the steam network is introduced.

The embodiment of the heat exchanger 3 shown in FIG. 3 is intended in particular for the system illustrated in FIG. 1; the heat exchanger and the injector pump 8 form a structural unit, and the head 53 carrying the injector pump 8 is embodied such as to assure that the supply of the heated heating medium to the injector pump 8 is effected with a little loss and as little noise as possible. The line 13 is omitted, resulting in a substantial simplification.

I claim:

1. Apparatus for regulated transfer of heat from a primary steam network (010-01-012) to a heat consumer (2) having
    a secondary heat network or circuit (04, 02);
    a heat exchanger (3) connected to the primary steam network and to the secondary network for heat exchange between steam in the primary network and a heat exchange medium in the secondary network;

a regulator valve (4) connected in the primary steam network to control heat consumption requirements by the consumer, the steam in the primary network being cooled to the point of condensation and being supplied at a predetermined excess pressure with respect to the pressure in the secondary network, and comprising, in accordance with the invention, an injector pump (8) having an injector nozzle (7) connected downstream of the heat exchanger and receiving the condensate therefrom at said predetermined excess pressure;

the injector pump having its injection intake connected in the secondary circuit (04, 02) to heat the secondary medium by flow through the heat exchanger and mixing the secondary medium in the injector pump with the condensate in the primary network, while providing energy to the secondary medium in the secondary circuit for circulation of the secondary medium within the secondary circuit and through the heat consumer (2) in accordance with a regulated, predetermined proportion as determined by said regulator valve (4).

2. Apparatus according to claim 1, wherein the secondary circuit includes a return flow line (02) from the consumer to a return flow line (012) of the primary network;

and a branching line from the return flow line (02) from the consumer connected to the heat exchanger (3);

and a regulating valve (18) in the connection between the return flow line from the consumer (2) to the return flow line (012) in the primary network.

3. Apparatus according to claim 1, wherein the injector pump (8) is of the controlled-injector pump type.

4. Apparatus according to claim 1, further including an additional pressure elevating pump (21) located in the secondary network between the heat exchanger (3) and the consumer, and downstream with respect to the flow direction of the injector pump (8).

5. Apparatus according to claim 4, wherein the pressure elevating pump (21) is intermittently operating.

6. Apparatus according to claim 2, wherein the valve (18) in the return flow line from the consumer to the condensate network (012) comprises a pressure maintenance valve, located between a junction of the branch from the return flow line (02) from the heat consumer (2) to the heat exchanger, and the return flow line to the condensate network (012).

7. Apparatus according to claim 1, further including a drain line (62) from the heat exchanger, said drain line being connected to the steam network in the vicinity of an inlet connection of the secondary circuit carrying the secondary medium.

8. Apparatus according to claim 1, wherein the heat exchanger (3) comprises a nest of pipes (5, 50) connected in the primary steam network;

the heat exchanger (3) is formed with a heat exchanger head (53), and the injector pump (8) is directly connected to the heat exchanger head (53) by a fitting (56).

9. Apparatus according to claim 8, wherein the heat exchanger pump (8) is connected to the head of the heat exchanger on the steam inlet side.

10. Apparatus according to claim 8, wherein the injector pump is directly connected and attached to the heat exchanger.

11. Apparatus according to claim 1, further including a hot-water heater (23) located in the heat exchanger (3).

* * * * *